United States Patent

[11] 3,561,709

| [72] | Inventor | Friedrich W. Bornscheuer<br>Stuttgart, Germany |
|---|---|---|
| [21] | Appl. No. | 741,954 |
| [22] | Filed | July 2, 1968 |
| [45] | Patented | Feb. 9, 1971 |
| [73] | Assignee | Demag Aktiengesellschaft<br>Duisburg, Germany |
| [32] | Priority | July 13, 1967 |
| [33] | | Germany |
| [31] | | P 15 83 234 |

[54] SUPPORT ARRANGEMENT FOR METALLURGICAL VESSEL
11 Claims, 6 Drawing Figs.

[52] U.S. Cl. ..................................... 248/141, 266/36
[51] Int. Cl. ..................................... A47f 5/12
[50] Field of Search ........................... 248/141, 142, 139, 140; 266/36P, R, 35, 13

[56] References Cited
UNITED STATES PATENTS

| 270,183 | 1/1883 | Dunnet | 248/141 |
| 2,389,482 | 11/1945 | Bixler | 248/142 |
| 2,976,090 | 3/1961 | McFeaters | 266/36P |
| 3,311,427 | 3/1967 | Toth et al. | 266/36P |

Primary Examiner—Edward C. Allen
Attorney—McGlew & Toren

ABSTRACT: A support arrangement for a metallurgical vessel tiltable about a pair of coaxial trunnions rotatable in bearings on a frame, one bearing being fixed and the other displaceable, includes a pair of upright supports each carrying a respective trunnion, with the supports interconnecting the bottom and the open top of the vessel independently of each other. Respective connecting elements interconnect the upper end of each support to the top of the vessel, and the supports are in adjacent laterally spaced relation to the sidewall of the vessel.

SUPPORT ARRANGEMENT FOR METALLURGICAL VESSEL

BACKGROUND OF THE INVENTION

A known mounting of metallurgical vessels comprises loose supporting rings carrying diametrically opposite coaxial trunnions mounted in suitable bearings to permit tilting of the vessel. It is essential, on the one hand, that these loose supporting rings should hinder heat expansion of the vessel as little as possible and, on the other hand, that they should be capable of ensuring reliable transmission of very large forces and torques in all tilted positions and expansion states of the vessel.

On older metallurgical vessels, fixed supporting rings are also used. Such a ring forms a belt secured around the shell of the vessel by screws, rivets, or welding. Because of the restraint of the form variation, the resulting radial forces, as the vessel heats up, lead to considerable stresses in the vessel shell, with a high stress gradient. An increase in the size of the vessel usually involves a temperature rise in the wall of the vessel, so that the stress peak becomes greater than permissible. Fixed supporting rings are therefore suitable for use only with vessels whose diameters range from relatively small to medium.

Known loose and fixed supporting rings are proving increasingly less able to cope with the requirements, relating to suspension of weight and displacement of the bearings, occurring with increasing converter size. While an attempt has been made to solve the problem of vessel suspension with the usual concentric supporting rings, with relatively expensive designs, it is precisely for this reason that this attempt did not meet all expectations. With increasing vessel size, the principles underlying the use of both fixed supporting rings and loose supporting rings prove disadvantageous. In fact, by purely geometric enlargement of a certain form of vessel, the bath in the vessel becomes increasingly deeper. For metallurgical reasons, however, the bath depth cannot be increased arbitrarily, because the reaction of the oxygen blown onto the bath surface is no longer intensive enough, and thus the efficiency of the process is reduced.

For this reason, with increasing vessel size but with equal depth of the baths or melts, converter vessels have an increase in diameter greater than the increase in height. The concentric supporting rings thus also become constructions of high material cost, the welding of which is difficult to control and the transportation and installation of which involve additional problems. In large converter units of this kind, defects occur already during construction, as well as in operation, and these often entail considerable disadvantages.

In an article in the journal "Iron and Steel Engineer," for June 1965, pages 111 to 120, it is stated (page 114) that the constructions are imperiled especially at rigidity cracks such as occur on a supporting ring. The article states that expansion restraints should be avoided as much as possible. If, for example, a very sharp rise in temperature of the vessel occurs at such a supporting ring formed by ring sheets, cover sheets, and formers, struts, props, or the like, the temperature increase will, as the article explains, often lead to cracks.

The article proposes a different method of reducing thermal stresses, namely by cooling the supporting ring. However, this further increases the cost, which is precisely what must be avoided. Welded supporting rings in the size necessary for 300-ton vessels are therefore of such considerable cost as to raise doubts not only of a technical nature but also of an economical nature.

In addition to the question as to the design of the supporting ring, whether the latter is welded or cast, there arises the problem of the connection thereof with the vessel. This connection, on the one hand, must transmit great forces but, on the other hand, should impede the heat expansion of the vessel as little as possible. While a supporting ring absorbs the static forces comprised of the weight of the converter plus the refractory lining, for the heat expansion an entirely different problem arises, namely that of permitting displacements between the vessel and the supporting ring. If the suspension of a medium sized vessel by so-called claws on the supporting ring, fastened on the vessel wall, has become possible to a certain extent, this is only through the use of especially ingenious devices which, of course, cannot be provided without considerable additional expense. With large sized vessels, it becomes increasingly urgent to render heat expansions harmless without too great an expense.

With present designs using claws and supporting rings, the limits of the technical and economical possibilities are exceeded as special sizes continue to increase. Although it is not necessary that the two values be balanced, there is a demand for an optimum size. At present, this size is determined by the technical characteristics of the supporting ring and by its cost, irrespective of whether the supporting ring is a cast construction or a welded construction.

SUMMARY OF THE INVENTION

This invention relates to a support arrangement for tiltable metallurgical vessels and, more particularly, to such a support arrangement which avoids constraining temperature-induced forces while safety transferring the load in all tilted positions of the vessel.

In accordance with the invention, special importance is attached to an easily attainable separation or disengagement of the vessel from its supporting construction, in order to facilitate and expedite exchange of vessels. The invention dispenses with the application of a concentric supporting ring in the central region of the vessel, and is based on an entirely new principle.

More specifically, the two trunnions, for tilting of the vessel, are connected to respective main upright supports which interconnect the bottom of the vessel and the open top thereof independently of each other. One or more elastic members are interposed at the upper region between the vessel and each upright support. For the case of axial lengthening of the vessel, the articulated connection is statically determined exactly, while the elastic connection is "substantially" statically determined. That is, it leads to very slight constraining stresses. A uniform radial expansion of the vessel is not impeded, and while a nonuniform radial expansion leads to constraints in the vessel and in the upright supports, these constraints can be maintained at a relatively low magnitude by a suitable form of the cross section of the upright supports. However, it is possible to avoid constraining stresses due to radial expansion of the vessel by the provision of joints in the lower portions of the upright supports.

In one specific embodiment of the invention, the upright supports comprise stirrup-shaped frames which form a substantially common plane with the longitudinal axis of the vessel. While, in the vertical axial position of the vessel, the stress on the vessel shell can be held within acceptable limits by supporting the vessel at its bottom region, both attachment points at the bottom region and at the mouth, in a horizontal axial position of the vessel, and in conjunction with the possibility of free expansion, solve the problem of holding the stress on the vessel shell within acceptable limits.

The support of the invention can be designed for smaller stresses than have hitherto occurred in claw-supported ring mounted vessels. The occurring stresses can be calculated relatively exactly, at least for the cold state of the supported vessel.

In accordance with a further feature of the invention, the stresses are distributed by an elastic means comprising rod-shaped and/or flexible plate-shaped elements which have an articulated connection with the wall of the vessel and with the upright supports. In addition to eliminating stress peaks, it is possible, with inclusion of the movements due to heat expansion, to load existing cross sections of a converter more uniformly, so that a favorable stress curve can be recorded, particularly in tilted positions of the converter or vessel.

The plate-shaped elements may comprise membrane type rings and plates which, if desired, are stiffened by ribs, boxes, tubes or the like, or are prebent or prestressed. This design permits the support to be adapted to the expansion of a particular vessel or converter while maintaining a desired centered position between the frames mounting the vessel for tilting. Depending on the expansion in length or diameter of the vessel, concave or convex membrane forms may be used. The stiffening in the central plate region serves the purpose of increasing the safety against buckling in the plate with respect to unstiffened cross sections, without substantially restricting other deformations of the plate.

An object of the invention is to provide an improved support arrangement for tiltable metallurgical vessels.

Another object of the invention is to provide such a support arrangement which avoids constraining forces due to temperature-induced expansions while safely transmitting loads in all tilt positions.

A further object of the invention is to provide such a support arrangement in which the vessel may be readily disengaged or removed from the support construction for interchange of vessels.

Still another object of the invention is to provide such a support arrangement which does not require a concentric supporting ring in the central region of the vessel, and which operates on an entirely new principle.

A further object of the invention is to provide such a support arrangement including a pair of upright supports in adjacent laterally spaced relation to the vessel and each carrying a respective trunnion, the supports interconnecting the bottom of the vessel and the top thereof independently of each other and connecting elements being provided to connect the upper end of each support to the top of the vessel.

Yet another object of the invention is to provide such a support arrangement in which the upright supports comprise stirrup-type frames coplanar with the longitudinal axis of the vessel.

A further object of the invention is to provide such a support arrangement in which the connecting elements comprise rod-shaped or flexible plate-shaped elements.

Another object of the invention is to provide such a support arrangement in which the connecting elements are articulated to the vessel and to the respective upright supports.

A further object of the invention is to provide such a support arrangement in which the connecting elements comprise plate-shaped elements in the form of membrane type rings and plates which may have their central portions stiffened in a suitable manner or which may be prebent or prestressed.

For an understanding of the principles of the invention, reference is made to the following description of typical embodiments thereof as illustrated in the accompanying drawings.

DESCRIPTION OF THE PREFERRED EMBODIMENTS

Figure 1:
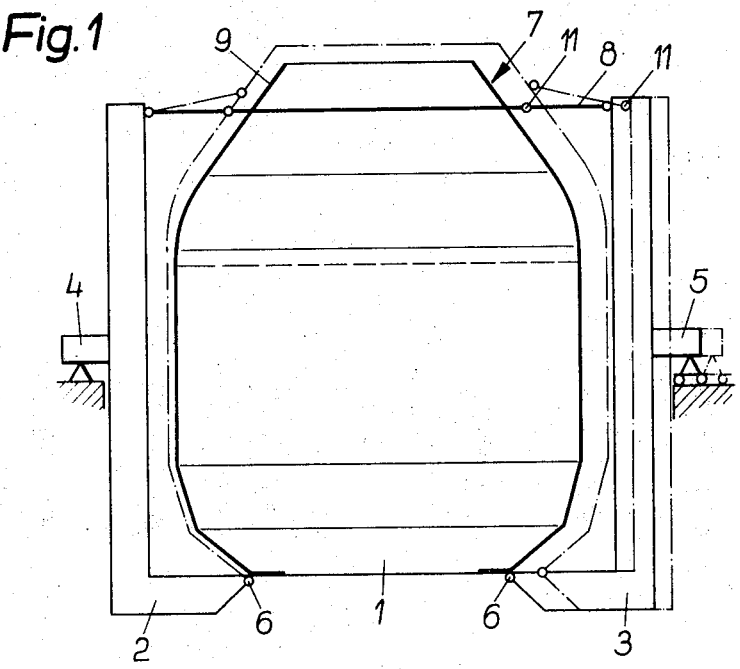
FIG. 1 is a side elevation view, partly in section, illustrating one support arrangement embodying the invention.
Figure 2:
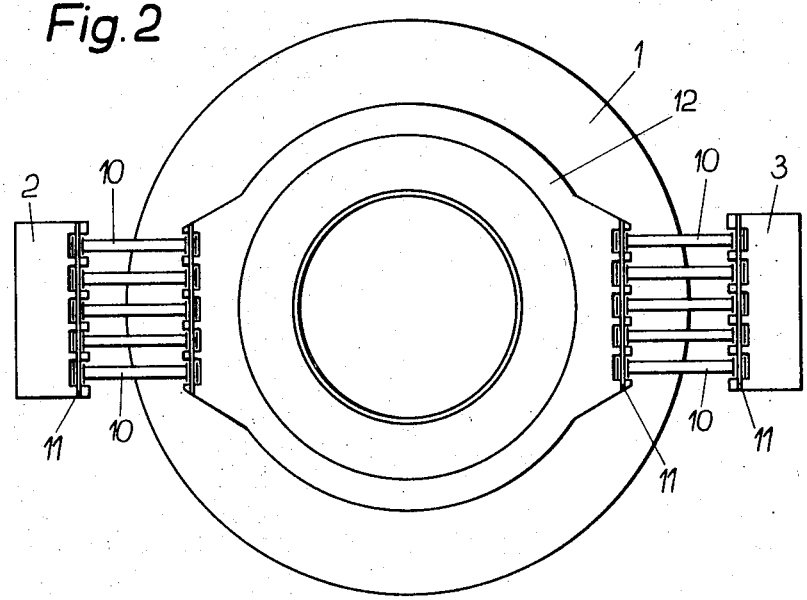
FIG. 2 is a top plan view corresponding to FIG. 1.

Referring first to FIGS. 1 and 2, a converter vessel 1 is illustrated as mounted on main upright supports 2 and 3 which are disposed on either side of vessel 1 but spaced somewhat therefrom laterally. The trunnions 4 and 5, for tilting of vessel 1, are fixedly connected to respective upright supports 2 and 3. Trunnion 4, as illustrated, is mounted in a stationary bearing on the supporting frame, whereas the bearing mounting trunnion 5 is displaceably mounted on the supporting frame. Main upright supports 2 and 3 have articulating points 6 at which they support the bottom of vessel 1. These upright supports embrace the vessel in the manner of a stirrup which is connected with the upper end of the vessel, in the region of the converter mouth 7, by rods 8 which are articulated to the wall 9 of the vessel and to the upper ends of upright supports 2 and 3. In FIG. 1 the expansion due to temperature is shown in dot and dash lines, as is also the resulting changed position of the elastic or flexible rods 8.

As best seen in FIG. 2, rods 8 consist of struts 10 which are fastened to upright supports 2 and 3 through hinge-type joints 11. The opposite ends of struts 10 are articulated to a membrane type ring 12 which surrounds the converter at its open upper end. Rods 8, instead of being constituted by the hingedly connected struts 10, may be designed as trusses.

Figure 3:
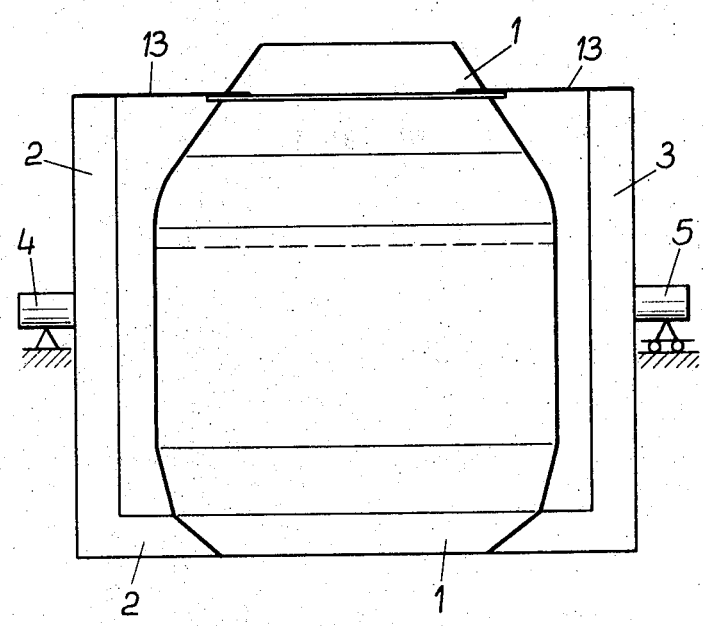
FIG. 3 is a view similar to FIG. 1 illustrating an alternative embodiment of the invention.
Figure 4:
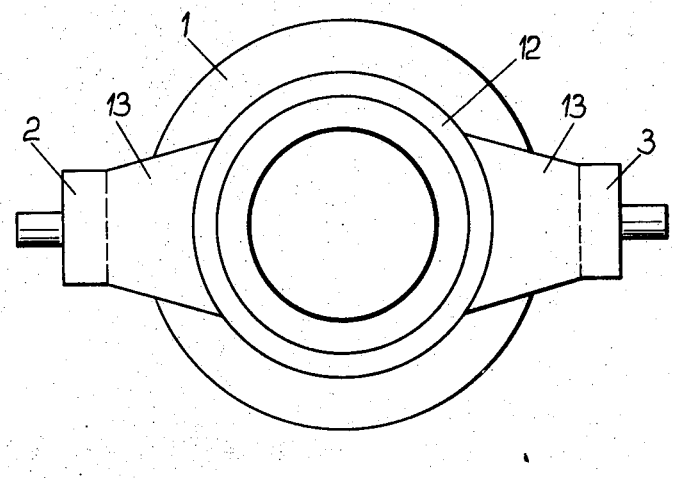
FIG. 4 is a top plan view corresponding to FIG. 3.

In the embodiment of the invention shown in FIGS. 3 and 4, the struts 10, acting as elastic members 8, are replaced by membrane type plates 13 connecting upright supports 2 and 3 either directly to the upper open end of the vessel or to the membrane type ring 12. In this embodiment of the invention, the lower ends of the upright supports 2 and 3 have inwardly projecting arms which are beveled to have conforming engagement with the beveled lower end of the vessel 1. Otherwise, the construction is the same as that shown in FIGS. 1 and 2.

Figure 5:
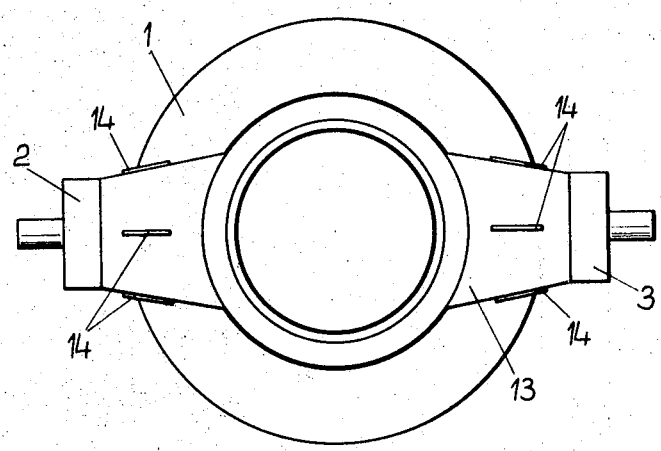
FIG. 5 is a top plan view illustrating elastic or flexible members connecting the upper ends of the upright supports to the vessel.

FIG. 5 illustrates an embodiment of the invention in which the plates 13 are reinforced by members 14 to provide a greater resistance to buckling. The reinforcements 14, which may be designed in the form of hollow boxes, tubes, or the like, are preferably arranged along only approximately one half the length of the plates 13, in order to preserve a sufficiently high flexibility of these plates.

Figure 6:
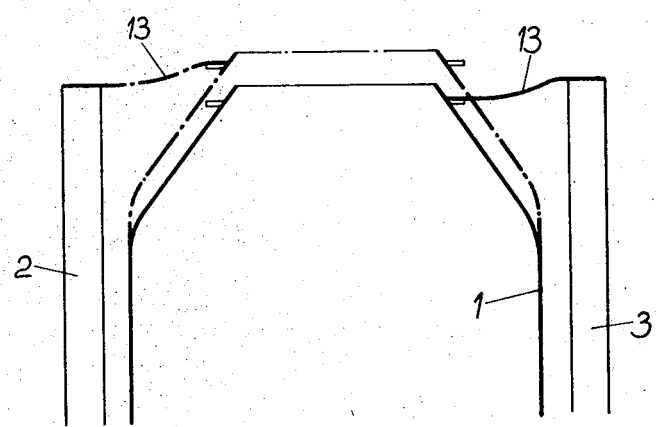
FIG. 6 is a partial elevation view illustrating the elastic connection members in orientations corresponding to different expansions of the vessel.

In the embodiment of the invention shown in FIG. 6, plates 13 have a predeformation, as shown at the right side of the FIG., imparted to these plates before they are installed. Thus, when the vessel 1 heats up and expands less stress will occur in the plates and the vessels. An axial or longitudinal expansion of the vessel is illustrated in the dot and dash lines at the left of FIG. 6.

I claim:

1. In a support arrangement for an open top metallurgical vessel subject to radial and axial thermal expansion and contraction during use, such as a steel mill converter, tiltable about a pair of diametrically opposite coaxial trunnions rotatable with respect to bearings on a frame, with one bearing and its associated trunnion being fixed and the other bearing and its associated trunnion being displaceable, the improvement comprising, in combination, a pair of upright supports in adjacent laterally spaced relation to said vessel to accommodate radial thermal expansion of said vessel, each support having a respective one of said trunnions fixed thereto, each support interconnecting the bottom of said vessel to the open top thereof independently of the other support; and respective connecting elements articulately interconnecting the upper end of each support to the open top of said vessel independently of the connection of each support of the bottom of the vessel, whereby the top and bottom of the vessel can move laterally and vertically, relative to the support, independently of each other, the connecting elements providing for axial expansion and contraction of said vessel longitudinally of said supports.

2. In a support arrangement for an open top metallurgical vessel, the improvement claimed in claim 1, in which said connecting elements comprise rods.

3. In a support arrangement for an open top metallurgical vessel, the improvement claimed in claim 1, in which said connecting elements comprise plates.

4. In a support arrangement for an open top metallurgical vessel, the improvement claimed in claim 1, in which said upright supports comprise stirrup-type frames centered in a common plane which is coplanar with the axis of said vessel.

5. In a support arrangement for an open top metallurgical vessel subject to radial and axial thermal expansion and contraction during use, such as a steel mill converter, tiltable about a pair of diametrically opposite coaxial trunnions rotatable with respect to bearings on a frame, with one bearing and its associated trunnion being fixed and the other bearing and its associated trunnion being displaceable, the improvement comprising, in combination, a pair of upright supports in adjacent laterally spaced relation to said vessel to accommodate radial thermal expansion of said vessel, each support having a respective one of said trunnions fixed thereto; each support interconnecting the bottom of said vessel to the open top thereof independently of the other support, and respective connecting elements interconnecting the upper end of each support to the open top of said vessel, and providing for axial movement of said vessel longitudinally of said supports; said connecting elements being flexible and having articulated connections with the wall of said vessel and with the respective upright supports.

6. In a support arrangement for an open top metallurgical vessel, such as a steel mill converter, tiltable about a pair of diametrically opposite coaxial trunnions rotatable with respect to bearings on a frame, with one bearing being fixed and the other displaceable, the improvement comprising, in combination, a pair of upright supports in adjacent laterally spaced relation to said vessel, each support carrying a respective one of said trunnions; said supports interconnecting the bottom of said vessel to the open top thereof independently of each other, and respective connecting elements interconnecting the upper end of each support to the open top of said vessel; said connecting elements being flexible rod-shaped elements and having articulated connections with the wall of said vessel and with the respective upright supports to provide for axial movement of said vessel longitudinally of said supports.

7. In a support arrangement for an open top metallurgical vessel, such as a steel mill converter, tiltable about a pair of diametrically opposite coaxial trunnions rotatable with respect to bearings on a frame, with one bearing being fixed and the other displaceable, the improvement comprising, in combination, a pair of upright supports in adjacent laterally spaced relation to said vessel, each support carrying a respective one of said trunnions; said supports interconnecting the bottom of said vessel to the open top thereof independently of each other; and respective connecting elements interconnecting the upper end of each support to the open top of said vessel; said connecting elements being plate-shaped flexible elements and having articulated connections with the wall of said vessel and with the respective upright supports and providing for axial movement of said vessel longitudinally of said supports.

8. In a support arrangement for an open top metallurgical vessel, the improvement claimed in claim 7, in which said connecting elements comprise a membrane form ring embracing the upper end of the vessel and plates connecting said ring to the respective upright supports.

9. In a support arrangement for an open top metallurgical vessel, the improvement claimed in claim 8, including reinforcing means stiffening the central areas of said plates.

10. In a support arrangement for an open top metallurgical vessel, the improvement claimed in claim 8, in which said plates are prebent.

11. In a support arrangement for an open top metallurgical vessel, the improvement claimed in claim 8, in which said plates are prestressed.